United States Patent [19]
Friedrichsen et al.

[11] 3,919,503
[45] Nov. 11, 1975

[54] APPARATUS FOR ESTABLISHING CROSS CONNECTIONS IN AN AUTOMATED MAIN DISTRIBUTING FRAME

[75] Inventors: Hans Jack Friedrichsen, Bernardsville; Peter Frank Mahr, Morris Plains; Alfred Otto Schwarz, Parsippany, all of N.J.

[73] Assignee: Bell Telephone Laboratories, Incorporated, Murray Hill, N.J.

[22] Filed: Sept. 9, 1974

[21] Appl. No.: 504,299

[52] U.S. Cl. .......... 179/175.2 R; 179/98
[51] Int. Cl.$^2$ .......... H04M 3/22
[58] Field of Search .......... 179/175.2 R, 175.23, 98; 317/101 C, 101 CE; 200/175

[56] References Cited

UNITED STATES PATENTS

| | | | |
|---|---|---|---|
| 3,450,950 | 1/1969 | Tarrats | 317/101 CE |
| 3,562,435 | 2/1971 | Joel | 179/16 |
| 3,732,379 | 5/1973 | Focarile | 179/91 |
| 3,763,325 | 10/1973 | Kapel et al. | 179/98 |
| 3,796,848 | 3/1974 | Southworth | 200/175 |
| 3,838,317 | 9/1974 | Coyne | 317/119 |

*Primary Examiner*—Douglas W. Olms
*Attorney, Agent, or Firm*—A. D. Hooper; R. O. Nimtz

[57] ABSTRACT

An automated actuator for establishing and terminating cross connections in an automated main distributing frame system by inserting and removing connectors on pin terminal switches within a lineup in such system comprises a coordinate locating apparatus for positioning the actuator adjacent the desired switch in a lineup. A switch engagement mechanism grasps and extracts the switch from the lineup to provide access to the pin terminals and test access to test terminals thereon. A connector placement and removal mechanism places or removes a connector on the designated pin terminals after which the switch is replaced in its lineup.

24 Claims, 20 Drawing Figures

APPARATUS FOR ESTABLISHING CROSS CONNECTIONS IN AN AUTOMATED MAIN DISTRIBUTING FRAME

BACKGROUND OF THE INVENTION

1. Field of the Invention

This invention relates to automated main distributing frames and more particularly to automated apparatus for establishing and terminating paths and connections in such a main frame.

2. Description of the Prior Art

Because of the high costs involved in the maintenance and operation of systems and apparatus such as the main distributing frame in telephone wire centers or central offices, there is increasing interest in automating such systems and apparatus. One such automated main frame system is shown in the copending application of R. F. Bergeron et al. Ser. No. 504,294, filed concurrently herewith and assigned to the assignee hereof. This automated system utilizes automated mechanical actuators under computer control for establishing and terminating cross connections on pin board switches thereby setting up and terminating paths and test connections through the system. These automated actuators require coordinate locating means for locating the desired switch and means for handling and providing test access to the switch once it has been located. Although the prior art shows various types of automated apparatus such as wiring machines none of this previously known apparatus possesses the features required of the automated actuators used in an automated main distributing frame.

Accordingly, it is an object of this invention to provide automated apparatus for establishing, terminating, and accessing cross connections in an automated main distributing frame.

SUMMARY OF THE INVENTION

The forgoing object and others are achieved in accordance with this invention by an actuator having a switch engagement mechanism for contacting or grasping a cross-connect switch and removing or partially withdrawing such a switch from a mounting cabinet or a like lineup where it is mounted along with a plurality of other switches. The switch engagement mechanism is positioned adjacent the appropriate switch by a coordinate positioning apparatus which moves the engagement mechanism in both the horizontal and vertical directions along the lineup of switches. The engagement mechanism includes a test connector for contacting test lands on the switch to provide test access thereto. The actuator further includes a connector handling mechanism for placing and/or removing connectors between terminals on the switch while it is withdrawn from its mounting cabinet to establish or terminate cross connections thereon to complete or disconnect a portion of a circuit path through the main frame.

BRIEF DESCRIPTION OF THE DRAWING

The invention will be more fully comprehended from the following detailed description and accompanying drawing in which.

DETAILED DESCRIPTION

Figure 1:
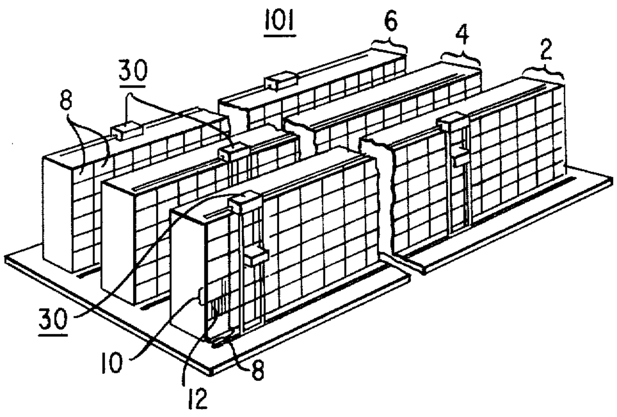
FIG. 1 is a schematic representation of an automated main distributing frame system utilizing the actuator of this invention.

FIG. 1 shows an automated main distributing frame system 101 such as shown in the previously mentioned copending application of Bergeron et al. System 101 includes one or more lineups 2, 4 and 6 of modules 8 which contain cross-connect switches 12 on which cross connections can be made to establish a path through system 101 for connecting outside plant conductors with central office switching equipment and the like. In an illustrative embodiment, each module 8 comprises a mounting cabinet having six rows 10 of switches 12 therein. A plurality of switches 12 are mounted in side-by-side book-like fashion within each row 10 of the module 8 and the switches 12 in the rows 10 are arranged in columns with respect to the switches 12 in adjacent rows.

Figure 2:
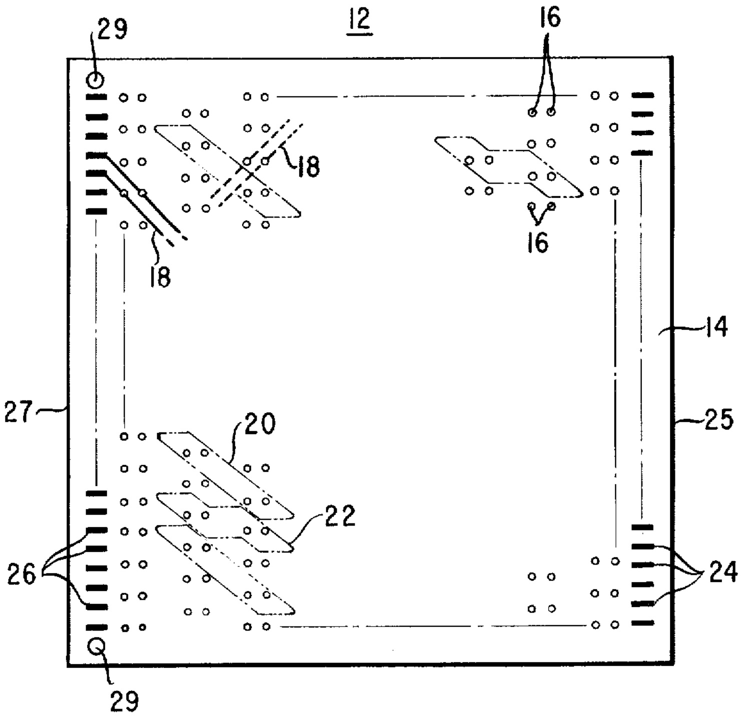
FIG. 2 is a representation of a pin terminal, cross-connect switch used in the system of FIG. 1 on which the actuator of this invention performs operations.

In an illustrative embodiment of the invention as shown in FIG. 2, the switches 12 comprise printed circuit boards 14 having pin terminals 16 extending from the major surfaces thereof. The pin terminals 16 are associated with respective conductors 18 on both sides of the board 14. U.S. Pat. No. 3,796,848 issued Mar. 12, 1974 to H. Southworth, Jr. and copending application Ser. No. 378,579 now U.S. Pat. No. 3,838,317 filed by J. C. Coyne on July 12, 1973 and both assigned to the assignee of this application, disclose pin connector switches which can be used for switdhes 12. Two connectors 20 and 22 having different configurations can be used on both sides of the aforementioned pin connector switches 12 to interconnect any possible pairs of conductors on the switch by interconnecting respective associated pin terminals 16. Thus, cross connections for establishing a path through system 101 are formed. Switches 12 also include interconnection terminals or lands 24 on the front edge 25 through which a switch 12 can be interconnected with other switches 12 by appropriate cable. In addition, the switches 12 include test terminals or lands 26 on the rear edge 27 through which test access to the switches can be established. Switch 12 also includes registration holes 29 along the front 27 thereof for purposes to be discussed subsequently.

As shown in FIG. 1 one or more actuators 30 are associated with each module lineup 2, 4, and 6. These actuators 30 operate under computer control and access designated switches 12 to install or remove connectors 20 and 22 thereon to establish or terminate the cross connections as discussed previously. In order to perform the connector installation or removal function, actuator 30 must perform the following operations:

move along the particular lineup in both the horizontal and vertical directions to a position adjacent the designated switch to be accessed;

withdraw the designated switch from its module or cabinet mounting to provide access to the pin terminals on the major surfaces thereof and to properly position the appropriate pin terminals horizontally with respect to the actuator;

position the connector placement head vertically with respect to the appropriate pin terminals;

install or remove the appropriate type of connector between the designated pin terminals; and replace the switch in tis module or mounting. It is also desirable that actuator 30 provide test connections on the switch during any access so that cross connections on the switch can be verified and other types of testing conducted. Apparatus for allowing actuator 30 to perform the foregoing operations will be discussed in detail below.

Figure 3:
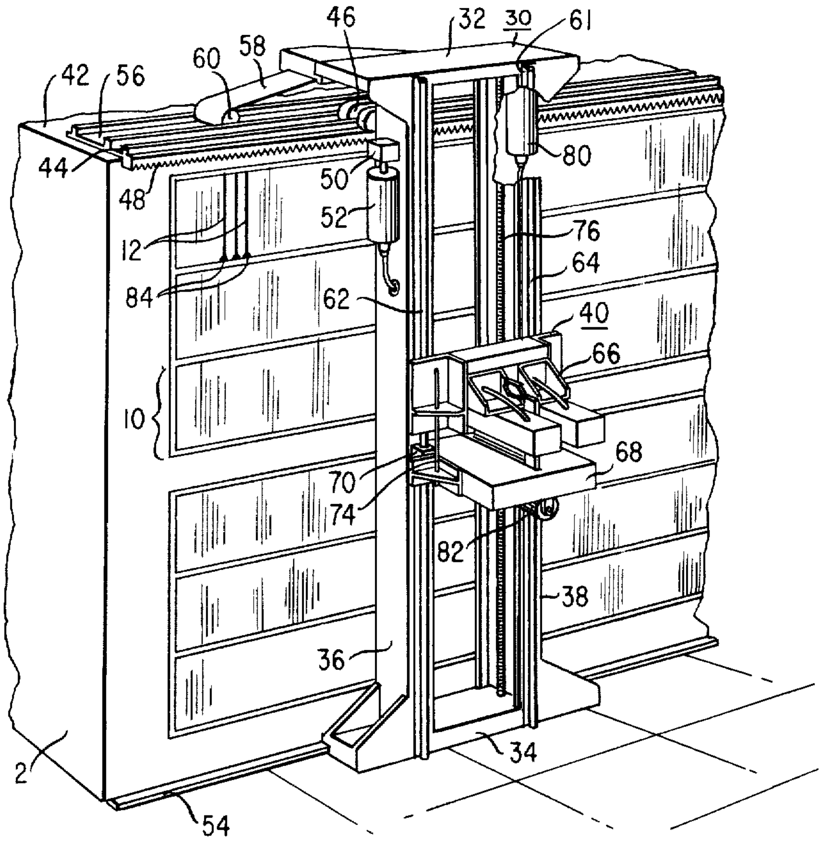
FIG. 3 is an enlarged partly broken away view of the actuator.

As shown in FIG. 3, actuator 30 comprises top and bottom support members 32 and 34, respectively, joined by two vertical column or support members 36 and 38. Mounted on column members 36 and 38 is the actuator head 40 which includes the switch engagement mechanism, connector placement mechanism, test access connectors, et cetera which will be discussed in more detail subsequently. Actuator head 40 must be moved horizontally and vertically with respect to switch lineup 2 to position it in front of a specific switch 12 on which connections are to be established or terminated. Horizontal movement is obtained by moving the entire actuator 30 along lineup 2 and vertical movement is obtained by moving head 40 up and down on column members 36 and 38.

Along the top 42 of lineup 2, i.e., along the top of the modular framework in which the switches are mounted, is attached a roundway or guide 44. Such ways or guides are commercially available. Top support member 32 includes two roundway bearings 46, also known in the art, which ride on roundway 44 to provide accurate horizontal tracking or guidance accuracy and support for actuator 30. Mounted beneath roundway 44 is a rack gear 48 known in the art. A mating pinion assembly 50 which is driven by an appropriate motor 52 mates with rack 48 and can be used to drive actuator 30 horizontally along roundway 44. Motor 52 and pinion assembly 50 can be mounted to vertical member 36 by lever controlled mounts known in the art to permit assembly 50 to be disengaged from rack 48 if removal of actuator 30 is desired. An idler pinion assembly advantageously can be mounted in engagement with rack 48 on the side of vertical member 38 to provide a more stable mounting of actuator 30 on roundway 44. Such an idler pinion assembly could also be mounted with lever controlled mounts to allow disengagement from rack 48 and removal of actuator 30.

A guide such as a rib 54 is located along the bottom front of lineup 2. Bottom member 34 of actuator 30 includes apparatus such as cam followers which engage guide 54 to provide guidance control and stability to actuator 30 and prevent the bottom thereof from being inadvertently moved outward respect respedt to lineup 2. Alternatively, guide 54 could comprise a channel which receives mating rollers on bottom member 34 to provide guidance control and stability.

A trough or channel 56 is mounted along the top 42 of lineup 2 adjacent roundway 44. Trough 56 is adapted to receive cabling 58 that provides the paths for signals and power between motor 52, actuator head 40 and the control apparatus associated with the computer. Cabling 58 can comprise flat cable which forms a loop in trough 56 about a take-up mechanism 60 such as known in the art. Vertical members 36 and 38 include appropriate channels therein for receiving the cabling directed to actuator head 40.

Vertical members 36 and 38 include vertical roundways or guides 62 and 64, respectively, similar to roundway 44, along the fronts thereof. Actuator head 40 comprises upper and lower platforms 66 and 68 respectively, having roundway bearings 70 and 72, embracing the roundways 62 and 64, respectively, for providing vertical tracking or guidance control. Platform 68 is connected to and suspended from platform 66 by two support rods 74 which permit relative movement between the platforms. The upper platform 66 is engaged by a roll nut screw 76 known in the art which is mounted along vertical member 38. A roll nut driven by a vertical drive motor 80 engages roll nut screw 76. Thus, upper platform 66, and thereby lower platform 68 suspended therefrom, can be moved vertically along guides 62 and 64 by rotating roll nut screw 76 the desired amount. Platforms 66 and 68 move together until lower platform 68 is properly positioned before the desired switch in lineup 2. Lower platform 68 is then locked in position on guides 62 and 64 by appropriate brakes known in the art. Roll nut 76 is then rotated an additional amount to move upper platform 66 relative to lower platform 68 on rods 74 until upper platform 66 is also properly positioned with respect to the desired switch whereupon platform 66 can also be locked in place on guides 62 and 64 by appropriate brakes. The amount of relative movement of platform 66 with respect to platform 68 will depend upon the particular pin terminals on the switch 12 which are to be interconnected as will become clearer subsequently.

The use of a rack and pinion for horizontal positioning and a roll nut and screw for vertical positioning provides positive drive and thereby accurate control of the location of actuator 30. Thus actuator 30 can be directed by its controlling computer to any particular switch the accurate location of which is stored in the computer. Control means for controlling the operation of horizontal and vertical drive motors 52 and 80, respectively, under computer command are well known in the art. Position accuracies of actuator 30 within 0.25 inch in both the horizontal and vertical directions can be attained without stringent control. Position accuracies within 0.01 inch can readily be obtained by relatively stringent control over the tolerances on the roundways and bearings, et cetera. The larger the permitted tolerances on the locations of the switches 12 and the location of the terminals thereon, the more rigid will be the requirements on the position accuracy of the actuator 40 in order to provide proper locating thereof with respect to the switches 12 and the terminals thereon.

If position accuracies better than those obtainable directly from the rack and pinion and roll nut and screw are required, a fine-positioning, photo-optical system can be utilized. One such photo-optical system shown in FIGS. 4 and 5 includes an optical position sensor 82 comprising a coaxial light source and photodiode detector known in the art mounted on the lower platform 68. The positioning of each cross-connect switch 12 in lineup 2 is indicated by a target as indicated by targets 84 in FIG. 3. Target 84 can comprise a white reflective circle defined by a black, nonreflecting background. The amount of light from the coaxial light source reflected by target 84 will depend upon the accuracy of positioning of the light source with respect to the target 84 and hence the accuracy of the positioning of actuator head 40 with respect to the desired switch 14. This reflected light is detected by the photodiode detector and used to control horizontal and vertical drive motors 52 and 80, respectively, to fine position the actuator head 40.

Figure 4:
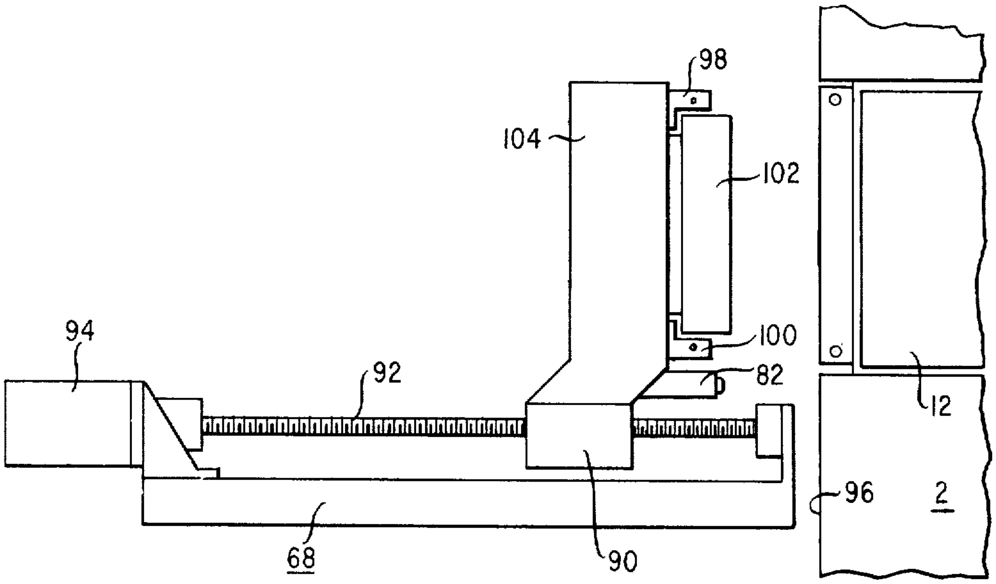
FIG. 4 is a schematic representation of the switch engagement portion of the actuator.

After actuator 30 has positioned itself properly with respect to the desired switch 12, it must then grasp the switch and remove it from the lineup or mounting frame to provide access to the pin terminals 16 thereon. The switch engagement apparatus for performing this function is located on lower platform 68 as schematically illustrated in FIG. 4. The switch engagement apparatus includes a carriage 90 mounted on a ball screw or roll nut screw 92 which is driven by a drive motor 94. Carriage 90 can be driven across platform 68 toward or away from the front 96 of lineup 2 by rotating screw 92 as known in the art. Mounted on carriage 90 are upper and lower sets 98 and 100, respectively, of engagement jaws, a test access connector 102, and an operating mechanism 104 for operating the engagement jaws and test access connector in the appropriate sequences and with the proper forces for engaging a switch 12 mounted in lineup 2.

Figure 5:
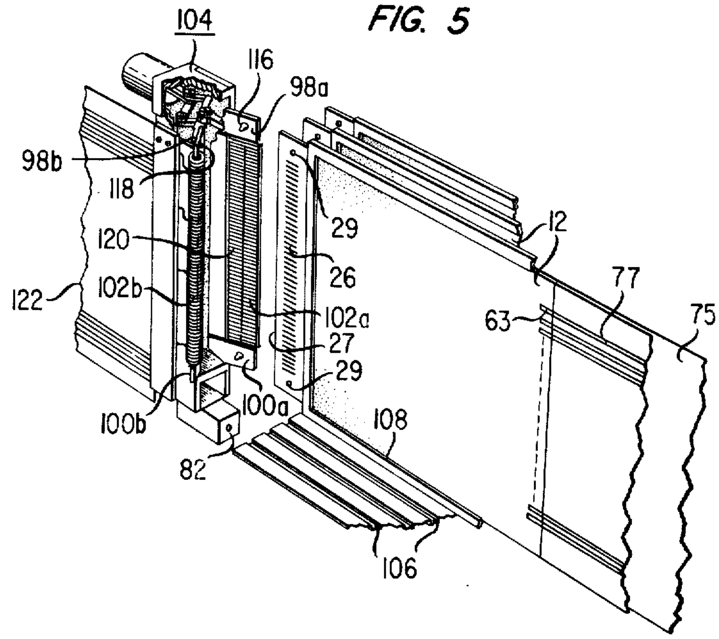
FIG. 5 is an enlarged perspective view of a portion of the apparatus of FIG. 4.

The operation of the engagement jaws and test access connector will become clearer by reference to FIG. 5. which shows a plurality of switches 12 slidably mounted in appropriate guides 106 and frames 108 within a lineup as previously mentioned. Each switch 12 includes two index holes 29 and a plurality of test access lands or terminals 26 along the front edge 27 thereof and advantageously on both sides of the switch. The upper set 98 of engagement jaws comprises an engagement jaw **98*a* having a conical tapered guide or engagement cone 116 thereon and a backup jaw 98*b* having a stop 118 with an opening therein adapted to receive guide 116. Lower set 100 of engagement jaws comprises an engagement pair 100*a* and a backup jaw 100*b* substantially identical to jaws 98*a* and 98*b*, respectively. Test access connector 102 comprises first and second halves 102*a* and 102*b*, respectively, having terminals or lands 120 therealong which are adapted to contact test lands 26 on respective sides of edge 27 of switch 12**.

When carriage 90 is advanced by motor 94 and ball screw 92 toward front 96 of lineup 2 to engage a switch 12, jaws **98*a* and 98*b*, jaws 110*a* and 100*b*, aND connector halves 102*a* and 102*b*, respectively, are spread open or expanded with respect to each other. When these jaws and connector halves are properly positioned about edge 27 of switch 12, operating mechanism 104 closes jaws 98*a* and 98*b* and jaws 100*a* and 100*b* with respect to each other about edge 27. Guides or pins 116 engage index holes 29 in switch 12 and edge 27 is firmly grasped between jaws 98*a* and 98*b* and jaws 100*a* and 100*b*. The tapered configuration of guides 116 provides for substantial tolerances in the location of switch 12 while still insuring the proper indexing or positioning of switch 12 with respect to jaws 98*a* and 98*b* and jaws 100*a* and 100*b* when the switch 12 is firmly grasped by these jaws. After jaws 98*a* and 98*b* and 100*a* and 100*b* have grasped edge 27, mechanism 104 closes connector halves 102*a* and 102*b* about edge 27 so that contacts 120 on these connector halves mate with contacts 26 on the respective sides of edge 27 to provide access for testing the circuitry and connections on or connected to switch 12. The closing of connector halves 102*a* and 102*b* about edge 27 subsequent to the closing of jaws 98*a* and 98*b* and 100*a* and 100*b* thereabout and the proper alignment of switch 12 by these jaws insures the proper mating alignment between contacts 120 and contacts 26. After switch 12 has been engaged by jaws 98*a*, 98*b*, 100*a* and 100*b* and connector halves 102*a* and 102*b*, as described, it can be withdrawn from lineup 2 by movement of carriage 90 away from the front 98 of lineup 2 by motor 94 and screw 92. This exposes the pin terminals 16 on the major surfaces of switch 12 for the insertion or removal of connectors for establishing or terminating cross connections on on the switch 12 as will be described subsequently. During this time various electrical tests can be performed on switch 12 through connector 102 which is connected to the appropriate test and control apparatus through cable 122**.

Figure 6:
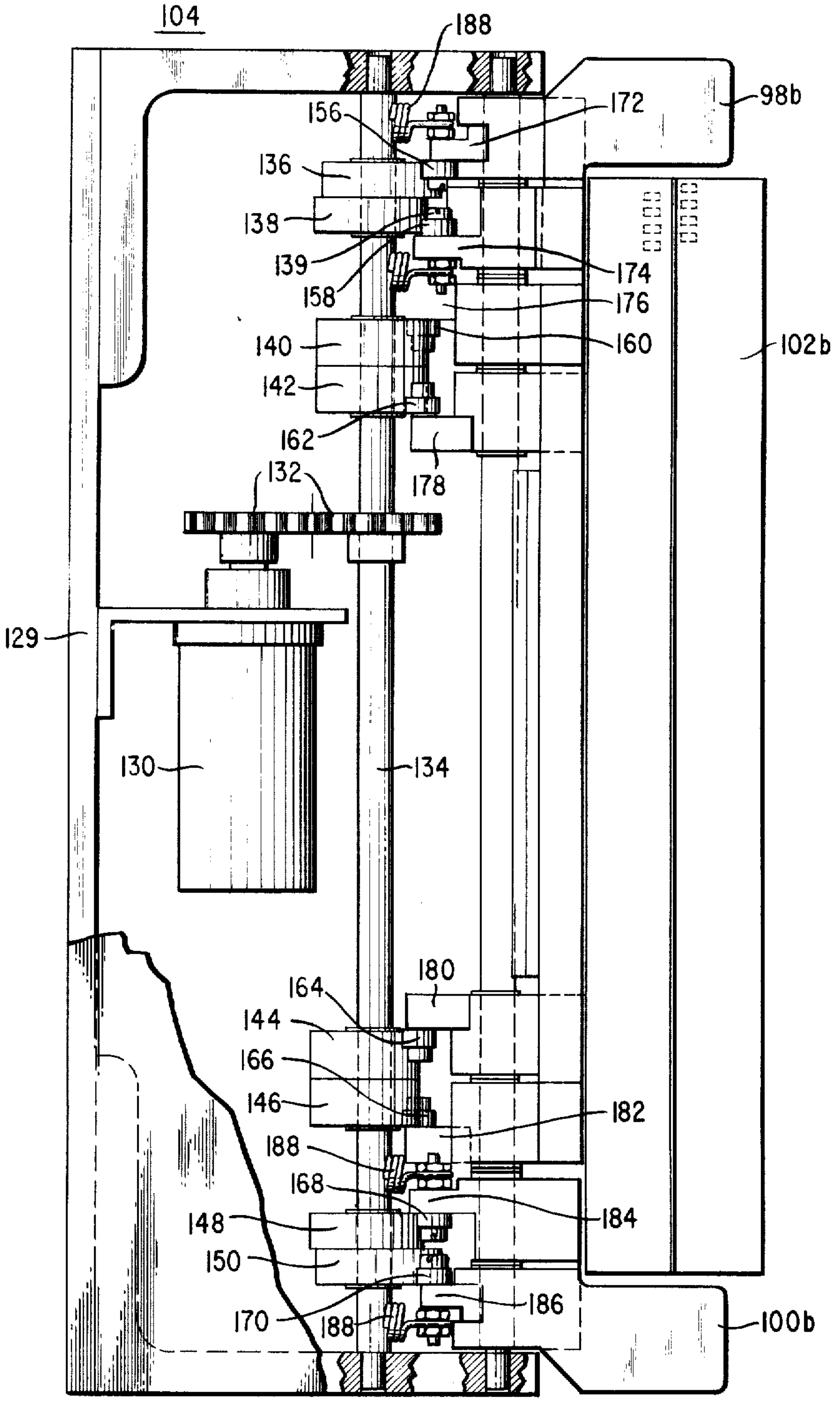
FIG. 6 is a detailed view of the operating mechanism used in the apparatus of FIG. 5.

Operating mechanism 104 advantageously comprises a motor-cam arrangement such as shown in a broken away elevation view in FIG. 6. A suitable motor 130 mounted to a frame 129 is coupled by appropriate gearing 132 known in the art to a cam shaft 134. Located along cam shaft 134 for rotation therewith are eight single lobe cams 136, 138, 140, 142, 144, 146, 148, and 150 which engage respective cam followers 156, 158, 160, 162, 164, 166, 168 and 170 such as ball bearing cam followers known in the art. The cam followers 156, 158, 160, 162, 164, 166, 168 and 170 comprise integral parts of respective arms or levers 172, 174, 176, 178, 180, 184 and 186 which are in turn connected to or comprise extensions of jaws **98*b* and 98*a*, connector halves 102*b* and 102*a*, connector halves 102*a* and 102*b* and jaws 100*a* and 100*b*, respectively. The arms are biased by tension springs 188** toward desired positions, e.g., toward a position which opens the respective jaws or closes the jaws depending upon the cam profile.

The rotation of cam shaft 134 and thereby the cams operates the cam followers and associated arms to open and close the respective jaws and connector halves about the edge 27 of switch 12 as earlier discussed.

Figure 7:
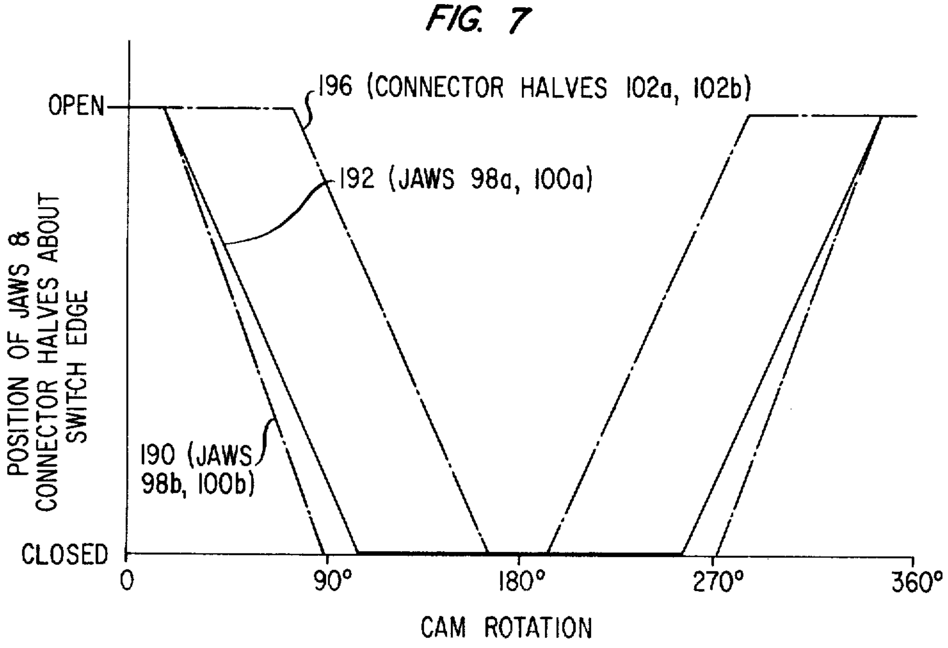
FIG. 7 is a schematic representation of the profiles of cams used in the operating mechanism of FIG. 6.

Since each cam 136–150 is a single lobe cam, one cycle, i.e., opening and closing, of the associated jaw or connector half is completed for each revolution of the cam. The exact sequence of openings and closings of the jaws will depend upon the cam profiles. These profiles are selected so that the connector halves 102*a* and 102*b* close about edge 27 to engage lands 26 after the engagement jaws 98*a* and 98*b* and 100*a* and 100*b* have grasped and properly aligned switch 12. These connector halves 102*a* and 102*b* subsequently open before jaws 98*a*, 98*b*, 100*a* and 100*b* release switch 12. The profiles for the various cams and the sequence of operations produced thereby are illustrated in FIG. 7. As shown by plots 190 and 192, respectively, jaws 98*a* and 100*a* and jaws 98*b* and 100*b* close about the switch edge before connector halves 102*a* and 102*b* and open after these connector halves have opened.

Figure 8:
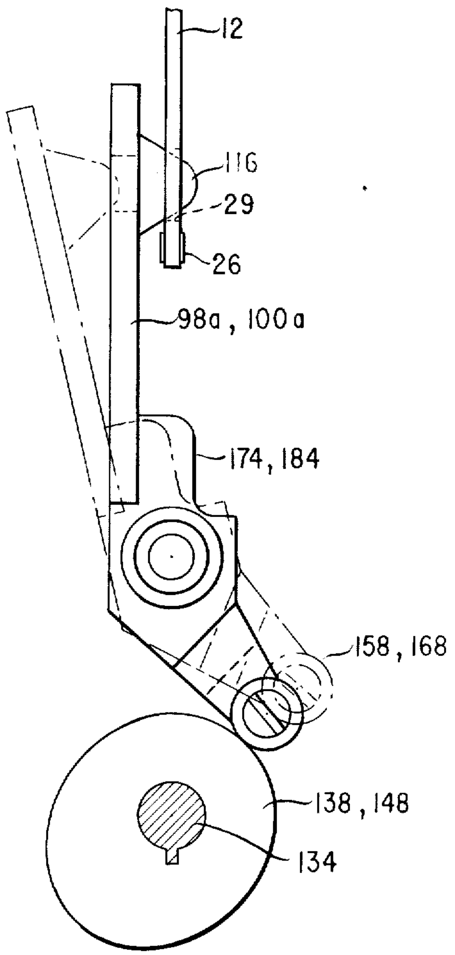
FIG. 8 is a representation of one of the switch engagement jaws of the mechanism of FIG. 5.

Engagement cone jaws 98*a* and 100*a* are biased toward their closed position by their associated tension springs 188. These jaws are closed on the low part of the profile of their associated cams 138 and 148 as illustrated in FIG. 8 and are forced open against the spring tension on the high part or lobe of the cam profiles. Thus these jaws 98*a* and 100*a* close about switch 12 in a force limited position determined by the force of the associated spring 188 which is chosen to prevent any damage to the switch.

Figure 9:
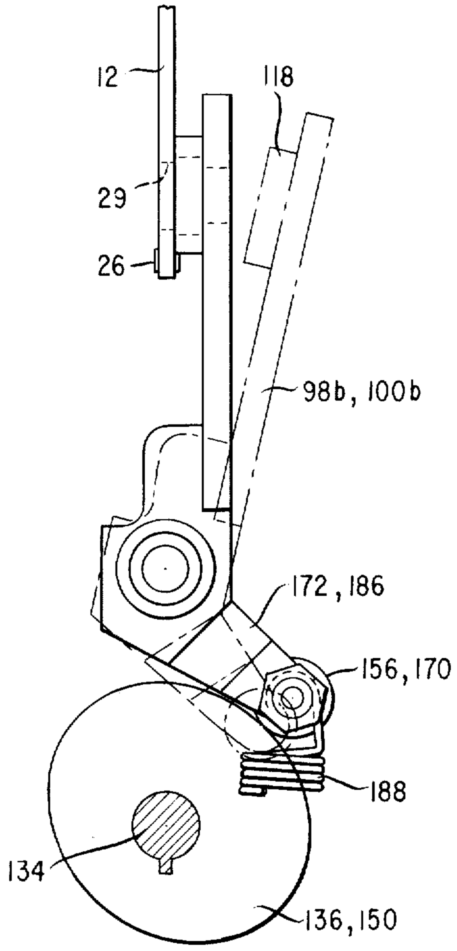
FIG. 9 is a representation of another of the switch engagement jaws of the mechanism of FIG. 5.
Figure 10:
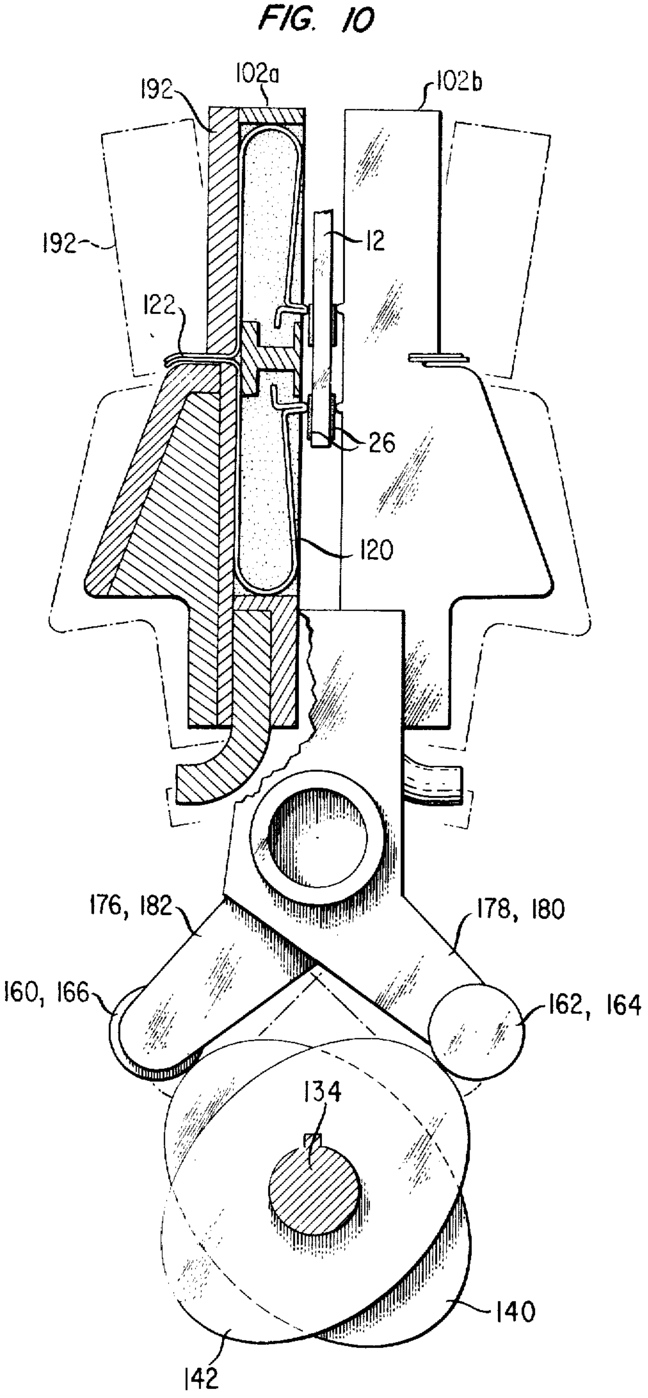
FIG. 10 is a representation, partly in section, of the test access connector portion of the mechanism of FIG. 5.

Backup jaws 98*b* and 100*b* and connecor halves 102*a* and 102*b* are biased toward their open positions by associated springs 188. These jaws and connector halves are forced closed by the lobe or high part of their associated cams as illustrated in FIGS. 9 and 10, respectively, for the jaws and connector halves. Thus these jaws 98*a* and 100*b* and connector halves 102*a* and 102*b* are displacement limited. The backup jaws 98*b* and 100*b* center and properly position switch 12 and the engagement cone jaws 98*a* and 100*a* lock or grasp switch 12 with the appropriate locking force. The displacement of jaws 98*b* and 100*b* and thus the centered or final aligned position of switch 12 can be adjusted by an adjustable eccentric shoulder screw 139 on the appropriate cam followers. Since all of the cams are mounted on a single shaft 134, they can be easily coordinated to provide the desired sequence of opening and closing.

FIG. 10 also illustrates one configuration for connector halves 102*a* and 102*b* in which contacts 120 comprise spring elements mounted in an insulative member 192 and attached to a cable 122 at the tip thereof. A plurality of contacts 120 can be arranged to contact test lands 29 in respective columns on switch 12 if more than one column of test lands 26 is needed.

Figure 11:
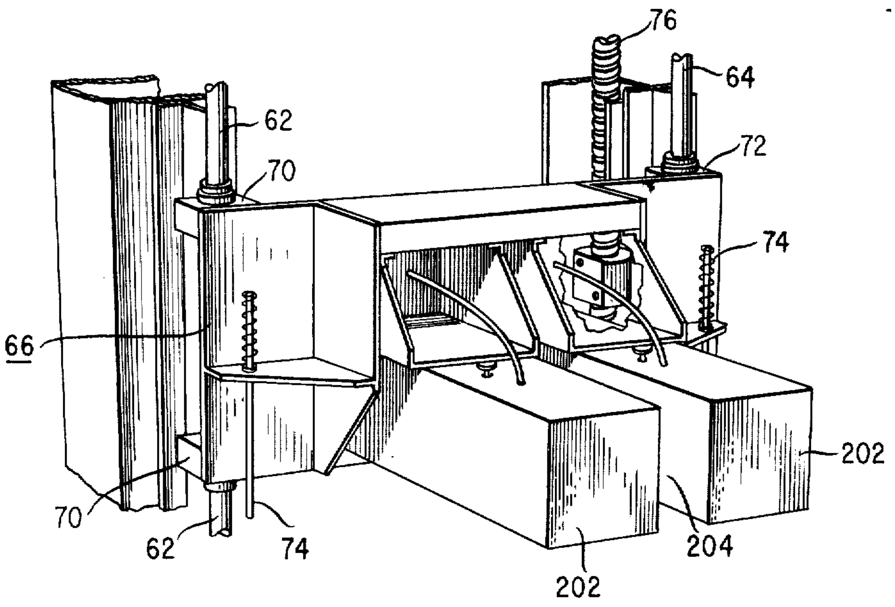
FIG. 11 is a perspective view of the connector placement portion of the actuator.

After switch 12 has been withdrawn from lineup 2 as discussed above, cross connections are established or terminated thereon by placing or removing short connectors 20 and 22 between appropriate pairs of pin terminals 19 as discussed with respect to FIG. 2. The connector placemnt and removal apparatus for performing this function is located on upper platform 66 as shown in FIG. 11. As earlier indicated, pin terminals 16 extend from both major surfaces of switch 12 and thus connectors can be installed on both major surfaces to prevent excessive crowding and possible interference which could happen if all connectors were installed on one side only of a switch 12. Accordingly, two connector placement and removel mechanisms or units 202 are mounted on upper platform 66 to lie on respective sides of a properly positioned switch.

When actuator 30 is directed to a specific switch 12, lower platform 68 including the previously discussed apparatus for engaging and withdrawing switch 12 from its lineup is first properly positioned horizontally and vertically with respect to switch 12 and locked in place on roundways 62 and 64. Thereupon, upper platform 66 moves with respect to lower platform 68 along support rods 74 until placement mechanisms 202 are properly positioned in the vertical direction to coincide with the vertical coordinate of the pair of pin terminals designated for making the desired cross connection. The switch engagement apparatus on lower platform 68 then engages or grasps switch 12 as previously explained and withdraws it horizontally from its lineup a sufficient amount to position the horizontal coordinate of the designated terminals 16 as required with respect to mechanisms 202. Switch 12 will lie in space 204 between mechanisms 202 with its relative position therebetween being dependent on the coordinates of the designated terminals 16. After this final positioning, mechanisms 202 place or remove the appropriate connectors 20 or 22 on a respective side. Switch 12 can then be replaced in its lineup by the apparatus on lower platform 68.

Figure 12:
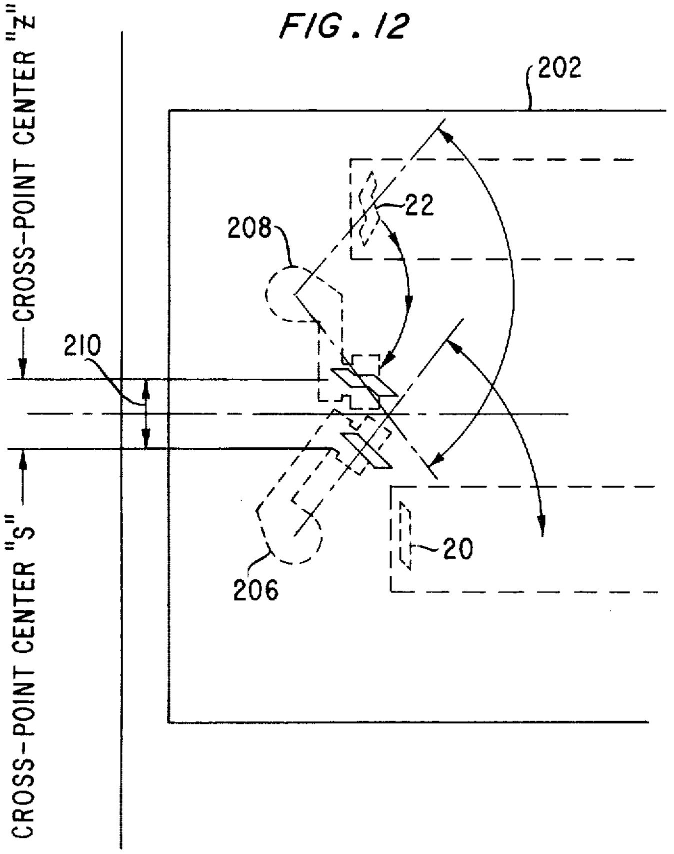
FIG. 12 is a schematic representation of the layout of the connector placement heads in the connector placement unit shown in FIG. 11.

All possible cross connections on switch 12 can be realized by using only two basic connectors 20 and 22 on the two sides of switch 12 as disclosed in the previously referenced patent and copending application. A separate placement head is used for each of these two types of connectors 20 and 22 because of the different orientations of the connectors with respect to switch 12. Thus each placement unit 202 includes two placement heads 206 and 208. Because of clearance requirements, the two placement heads 206 and 208 within a unit 202 cannot occupy a common target position for reasons as schematically illustrated in FIG. 12. Necessarily there is a vertical offset 210 between the two heads 206 and 208. Thus upper platform 66 will position placement units 202 vertically slightly differently relative to switch 12 depending upon what type of connector has been specified for making the required connection. The placement units 202 for the respective sides of switch 12 are identical and the two placement heads for a particular unit are substantially the same except for minor dimensional and orientation differences. Accordingly, only one placement head will be described in detail.

Figure 13:
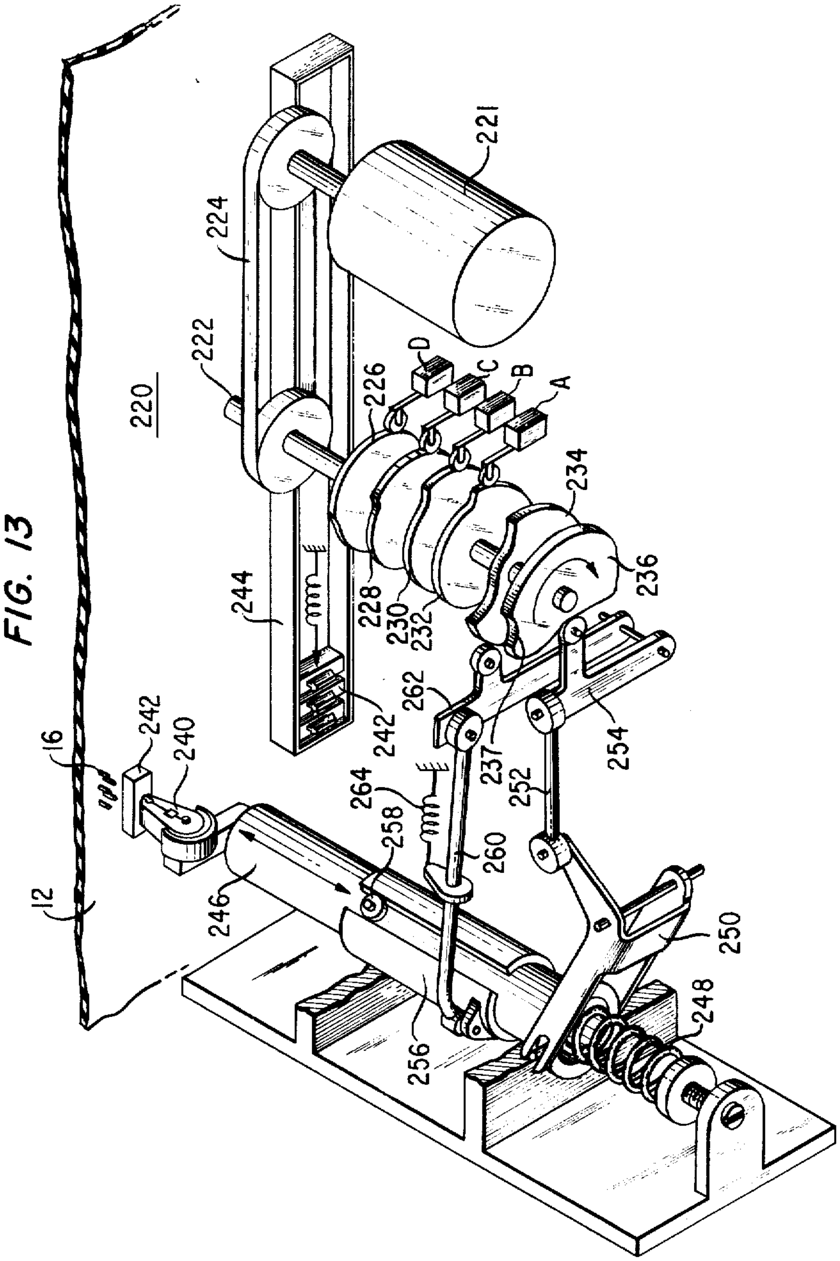
FIG. 13 is a detailed schematic representation of a connector placement head.

The mechanical features and functions of a placement head 220 which could be used for head 206 and 208 are schematically illustrated in FIG. 13. A gear motor 221 drives a cam shaft 222 through a cog belt 224 or similar drive. Cam shaft 222 includes six cams 226, 228, 230, 232, 234 and 236 mounted thereon. Connector placement jaws 240 are designed for grasping and removing a connector 242, such as connector 20 or 22, from a connector magazine 244 and placing such connector 242 onto appropriate pin terminals 16 on a switch 12 to thereby establish a cross connection. Jaws 240 can also grasp a previously installed connector 242 and remove it from a switch to terminate a cross connection.

The movement of jaws 240 from a connector pickup position to a connector placement position, et cetera is produced by the movement of a plunger 246 which is powered by a compression spring 248. Spring 248 is force limited to a value which will prevent damage to pin terminals 16 on switch 12 in the event of teminal misalignment or other connector placement malfunction.

A yoke 250 is connected to the rear of plunger 246 and is connected via linkage 252 to a cam follower 254 which engages plunger cam 236. Cam 236 drives cam follower 254, linkage 252 and yoke 250 to provide a rearward translation or stroke to plunger 246 from the connector placement position shown against the bias of spring 248.

Plunger 246 is mounted within a sleeve 256 by suitable roller or bearing means 258 which allows plunger 246 to move axially through sleeve 256 but reguires plunger 246 to rotate with sleeve 256. A linkage 260 connects sleeve 256 to a cam follower 262 which mates with transfer cam 234. A tension spring 264 biases sleeve 256 to rotate clockwise as viewed from compression spring 248. Accordingly, on the low profile portion of cam 234, sleeve 256 under the tension of spring 264 rotates plunger 246 clockwise to place jaws 240 into the proper connector pickup orientation with respect to magazine 244. This rotation to the pickup position is coordinated with the withdrawal or translation of plunger 246 to the rear under the force of yoke 250 as previously discussed.

Figure 14:
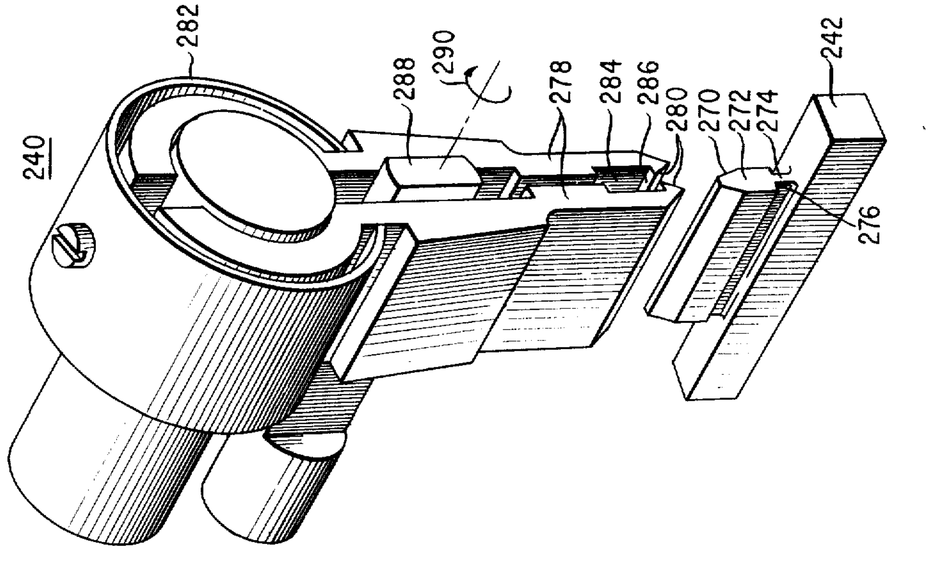
FIG. 14 is a detailed view of the connector grasping jaws used in the placement head of FIG. 13.

Jaws 240 must grasp connector 242 at the appropriate times and also release it at designated times. FIG. 14 shows the details of jaws 240 and connector 242 which are of significance in the performance of these functions. Connectors 242 must be capable of nesting side-by-side on switch 12 and thus access for grasping the side of connector 242 is precluded. Accordingly, a lip or barb 270 has been provided on connector 242 for grasping by jaws 240. Barb 270 is narrower than the body of connector 242. Barb 270 has a tapered upper portion 272 and a necked down portion 274 having flanges or lips 276 at the top thereof. Jaws 240 comprise first and second jaw halves 278 which are biased toward each other by a spring clip 282. Halves 278 include recessed portions forming a cavity 284 adapted to receive barb 270. Halves 278 include tapered ends 280 which engage tapered portion 272 of barb 270 to spread halves 278 and allow them to snap over barb 270, in the forward or connector pick-up direction. Halves 278 also include lips 286 which engage lips 276 on barb 270 to prevent release of the barb 270 without a positive spreading of halves 278. This positive spreading of jaw halves 278 is provided by a rectangular cross-section blade 288 which is inserted therebetween ans which can be rotated to spread the halves 278 as indicated by arrow 290.

Figure 15:
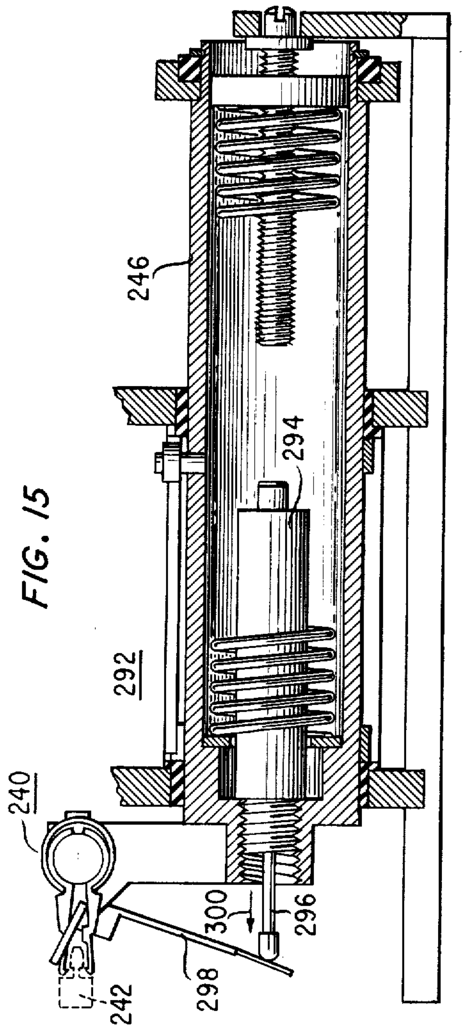
FIG. 15 is a partly sectional representation of an operating mechanism for the jaws of FIG. 14.

The rotation of blade 288 is controlled by a solenoid mechanism 292 contained in plunger 246 as illustrated in FIG. 15. A solenoid 294 includes a plunger or pin 296 extending from the end thereof to contact a paddle or lever 298 which can be connected to blade 288. Solenoid 294 under proper control can move pin 296 forward as indicated by arrow 300 to thereby rotated lever 298 and blade 288 to open jaw halves 278 as indicated. Jaw halves 278 are returned to closed position by spring clip 282. To insure that a connector 242 is discarded and not retained in jaws 240 even though they may be opened, a solenoid controlled arm or barrier can be moved alongside jaw halves when they are open to dislodge any retained connector.

Figure 16:
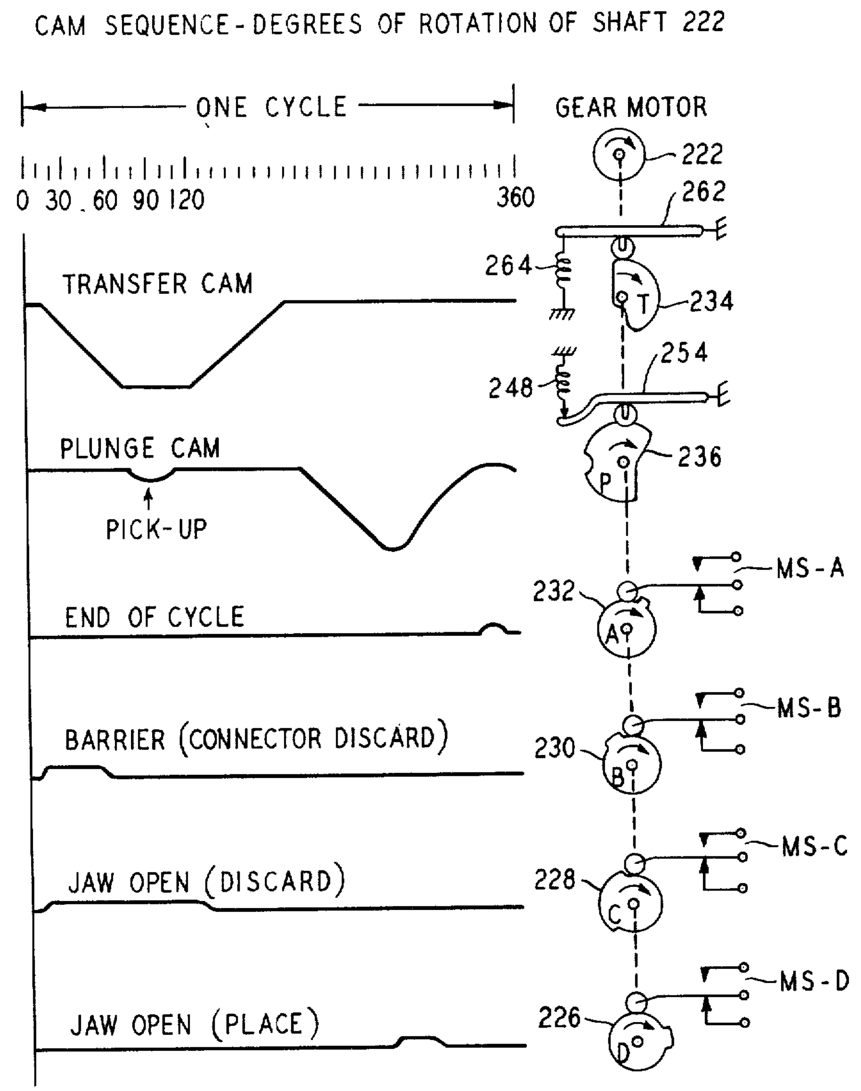
FIG. 16 is a schematic representation of the profile of the cams used in the placement head of FIG. 13.
Figure 17:
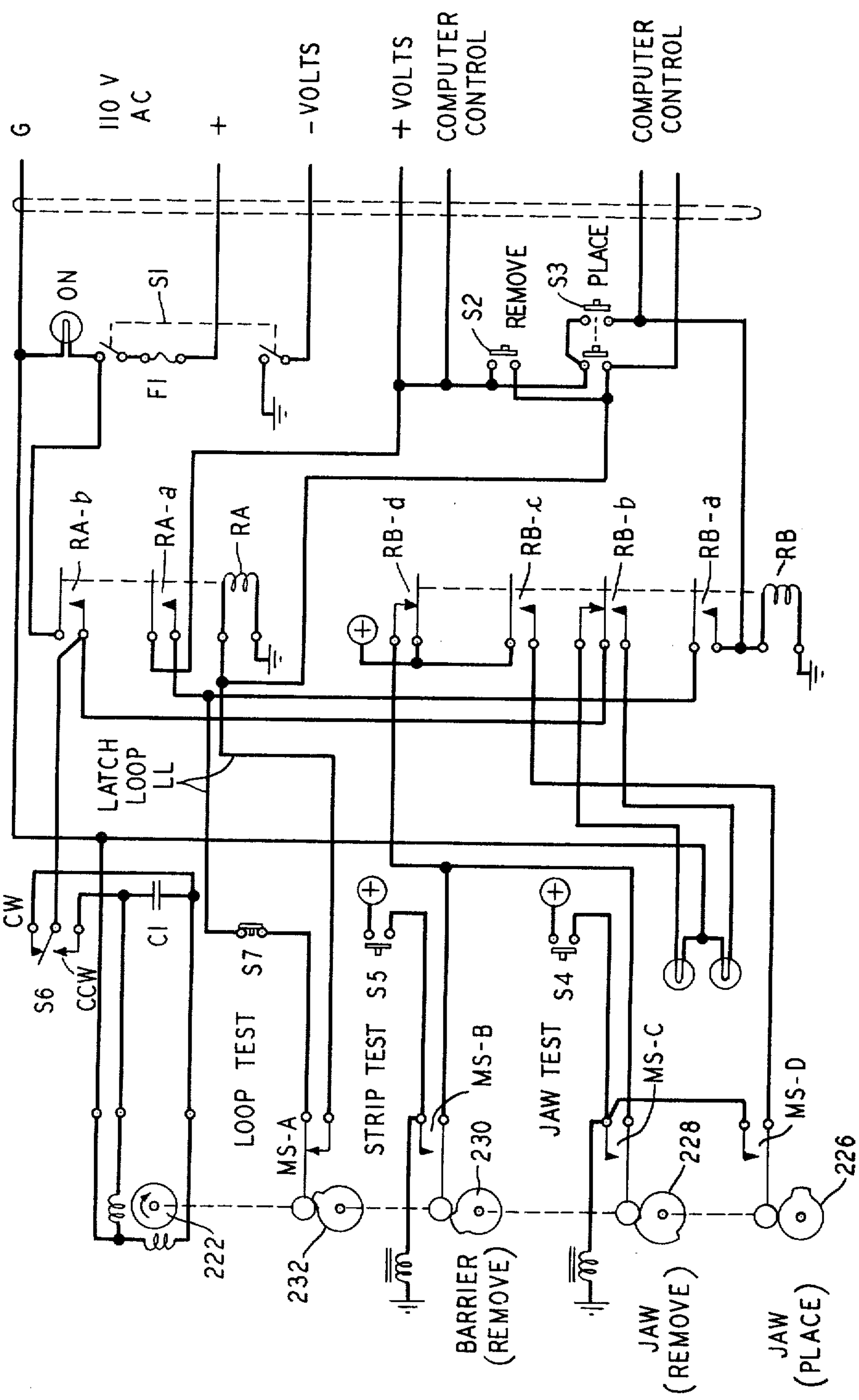
FIG. 17 is a schematic diagram of the control circuit for the placement head of FIG. 13.

Cams 226, 228, 230 and 232 on cam shaft 222 operate microswitches MS-D, MS-C, MS-B, and MS-A, respectively, which control the functions of the jaw opening solenoid 294 and the mentioned barrier solenoid. The profiles of the various cams on shaft 22 are as schematically illustrated in FIG. 16 to insure that all operations of placement head 220 are properly sequenced. A diagram of the control circuit for controlling the operation in response to the movement of the cams is shown in FIG. 17 and the functions or duty cycles of head 220 are as described below.

To place a connector 242 on designated pin terminals 16 of a switch 12, a control signal from the control computer momentarily closes switch S3 thereby activating relay RA and RB. Relay RA self-latches by closing normally open contact RA-a and the indicated latching loop LL and thereby also latches relay RB. Power is connected gear motor 222 via normally open contact RA-b and the duty cycle of placement head 220 begins. From the position shown in FIG. 13, the jaws 240 transfer to the magazine connector pick-up position. Microswitches MS-B and MS-C are disabled by the opening of normally closed contact RB-d during this cycle to prevent discarding a connector 242 if one has been retained in jaws 240 from the previous cycle. If such a connector 242 is in jaws 240 it merely bumps against magazine 244 during the "pick-up motion" and is carried along as if it has been pulled from magazine 244. If jaws 240 are empty during the "pick-up cycle", jaws 240 will move forward under the urging of spring 248 and plunger 246 enough to grab a new connector 242 from magazine 244. The motion continues as jaws 240 transfer or rotate back to a neutral position out of alignment with magazine 244. The plunge stroke begins from this neutral position under the force of the compression spring 248. Jaws 240 plunge to the switch 12 and push connector 242 onto the appropriate pin terminals 16 thereon. Microswitch MS-D is enabled at this point in the cycle through the closing of normally open contact RB-c to open jaws 240 to release the connector 242 and leave it behind as plungerr 246 retracts jaws 240 under the force of yoke 250 and returns jaws 240 to the neutral position. As the cycle continues cam 232 opens microswitch MS-A to momentarily break the latch loop LL, causing relays RA and RB to drop out, thereby removing motor power to motor 221 as cam follower 254 drops into the mechanical detent or low part 237 on cam 236.

To remove a previously placed connector 242, a control signal momentarily closes switch S2 to activate relay RA. Relay RA self-latches via contact RA-a and the indicated latching loop LL. Power is applied to motor 221 via contact RA-b. From the neutral position jaws 240 begin to transfer or rotate to the magazine connector pick-up position. However, microswitches MS-B and MS-C now are closed via contact RB-d which is closed since relay RB is not activated. These microswitches MS-B and MS-C open jaws 240 and introduce a barrier during the transfer to knock away any retained connector 242 if such connector 242 has been held over from a preceding cycle. Jaws 240 continue to be held open during this part of the cycle to prevent grabbing a new connector 242 from magazine 244. Jaws 240 then plunge to the indicated terminals on switch 12 and snap onto the cnnector 242 to be removed. At this point microswitch MS-D is open because of contact RB-c which is normally open and jaws 240 remain closed as the connector 242 is pulled off the switch 12 in the return stroke to the neutral position under the force of yoke 250. This removed connector 242 is now retained in jaws 240, either to be placed on a switch if the next work order is a connector placement, or to be discarded if the next order is a connector removal.

The above indicated sequences of operation result in a maximum reuse and minimum discarding of connectors 242 while retaining relatively simple duty cycles and control circuit complexity. These sequences also permit pulling and replacing a specific connector 242 at a specific location on a switch 12 for purposes of circuit testing by the simple procedure of a "REMOVE" command followed by a "PLACE" command.

Figure 18:
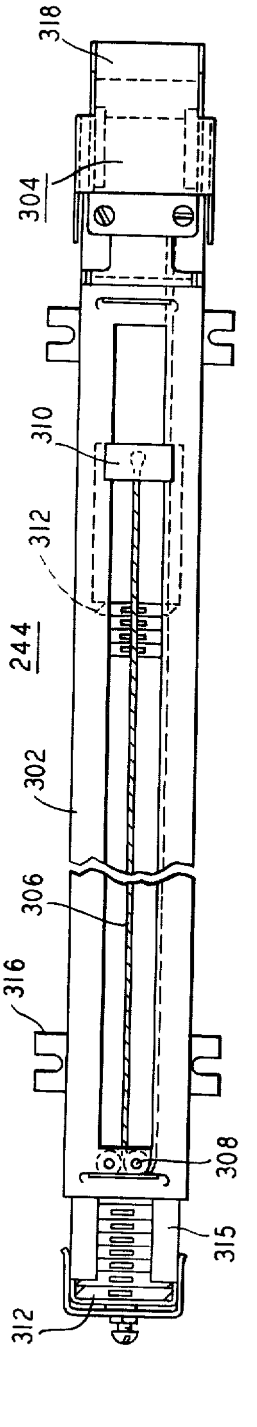
FIG. 18 is a front elevation view of a connector holding magazine for use with the placement head of FIG. 13.
Figure 19:
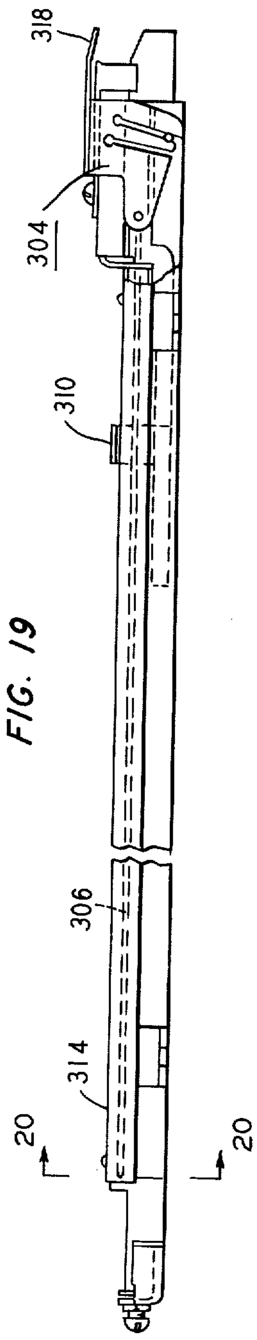
FIG. 19 is a bottom view of the magazine of the FIG. 18.
Figure 20:
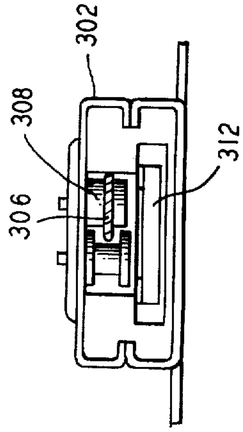
FIG. 20 is a sectional view along lines 20-20 of FIG. 19.

One basic magazine 244 will suffice for both types of mentioned connectors with only minor differences in detail. As shown in FIGS. 18–20, magazine 244 includes an elongated shell or body 302 having a constant force spring drive 304 in one end thereof. A flexible follower cable 306 proceeds from drive 304 to the opposite end of body 302 where it loops around a pulley arrangement 308 and then proceeds back toward the first end to connect to a follower block 310 adapted for pushing connectors 312 along the magazine. The top 314 of body 302 terminates short of the end of body 302 to leave at least one connector 312 exposed for pickup by placement head 220 as earlier discussed. A plurality of other connectors 312 are retained by lips or flanges 315 in the end of the magazine. Magazine 244 includes appropriate mounting means such as tabs 316 and retaining clip 318 for mounting it in a placement unit 202. The magazine capacity can vary over a broad range. Preferably, the four magazines 244 utilized in the two replacement units 202 of an acutator would have sufficient capacity to provide for a complete day's activities. The magazines could then be replaced or reloaded during a standard period of low activity on the main frame.

Connector placement units 202 advantageously are removably mounted on upper platform 66 by an adjustable mount. Accordingly, if any portion of a particular unit 202 should malfunction or fail, the unit can be quickly replaced by a properly functioning unit. As earlier mentioned, the entire actuator 30 can also be removed and replaced by disengaging the horizontal drive pinion assembly 50 and the idler pinion assembly.

More than one actuator 30 may be utilized to serve a single lineup 2 of switches 12. Each actuator 30 in principle can access and serve the complete lineup. However, the plurality of actuators 30 would operate under computer control to serve the lineup in the most efficient manner and to prevent any interference between the actuators 30 as they operate on the same roundways 44 and rack 48. If one actuator 30 serving a particular lineup fails, any other actuators also serving the lineup are reorganized by the computer to pick up the load previously carried by the failed acutator 30. If the horizontal drive of an actuator 30 remains operational even though there is some other operational failure thereof, such an actuator can be "floated" on the lineup until such time as it can be removed for repairs, i.e., can be moved about to keep it out of the way of the remaining actuators.

For safety reasons, appropriate limit or bump switches well known in the art can be incorporated on actuator 30 and platforms 66 and 68 to cut off power to this apparatus and stop movement thereof in the event of contact with another object such as a person or another actuator 30. The brakes for locking actuator 30 and platforms 66 and 68 to their respective roundways advantageously are fail safe type brakes which are operated by the limit switches or by loss of power to the actuator 30, to stop all movement of the acutator 30.

The motors such as horizontal drive 52, vertical drive 80 and switch engagement mechanism motor 94 advantageously are d-c motors which minimize the ground loop problems between the actuators 30 and operating personnel.

While the invention has been described with reference to specific embodiments thereof, it is to be understood that various modifications might be made thereto without departing from its spirit and scope. For example, the motor-cam arrangement described for the switch engagement mechanism could be replaced by a solenoid-linkage arrangement. The roll nut screw providing vertical motion can be replaced by a rack and pinion such as used for providing horizontal motion. All such modifications are intended to fall within the scope of this invention.

What is claimed is:

1. Automated apparatus responsive to control signals for establishing and terminating cross-connections and providing test access to switches in an automated main distributing frame having a plurality of said switches in a lineup comprising rows and columns of said switches served by said apparatus, each of said switches including terminals thereon adapted to receive connectors therebetween for establishing said cross-connections and test lands along an edge thereof, comprising, in combination:

a switch engagement means for removing and replacing a respective one of said switches in said lineup;

connector placement means for installing and removing said connectors between said terminals when said respective switch is removed from said lineup;

positioning means for positioning said engagement means and said connector placement means adjacent said respective switch in said lineup; and a test connector for contacting said test lands for providing said test access when said switch engagement means engages said switch.

2. Apparatus in accordance with claim 1 wherein said positioning means includes:

a horizontal guide mounted along said lineup of switches;

a first member mounted on said horizontal guide for movement therealong;

a vertical guide supported by said first member, said engagement means and said connector placement means being mounted on said vertical guide for movement therealong;

a first drive means for moving said first member along said horizontal guide to thereby position said engagement means and said connector placement means in a horizontal direction with respect to said switch; and a second drive means for moving said engagement means and said connector placement means along said vertical guide to thereby position said engagement means and said connector placement means in a vertical direction with respect to said switch, whereby said engagement means and said connector placement means can be positioned adjacent any said switch in said lineup.

3. Apparatus in accordance with claim 2 wherein said connector placement means and said engagement means comprise first and second platforms, respectively, mounted on said vertical guide, and support rods supporting said second platform from said first platform to allow relative movement therebetween on said vertical guide.

4. Apparatus in accordance with claim 3 wherein:

said horizontal guide comprises a horizontal roundway and said first member includes bearing means for engaging said horizontal roundway to accurately guide said first member therealong;

said vertical guide comprises first and second vertical roundways and said first and second platforms include bearing means for engaging said first and second vertical roundways to accurately guide said first and second platforms therealong;

said first drive means includes a rack mounted along said lineup, a pinion mounted on said first member and engaging said rack, and a first motor for driving said pinion to move said first member along said rack; and said second drive means includes a vertical roll nut screw mating with said first platform, a roll nut engaging said roll nut screw and a second motor for driving said roll nut to rotate said roll nut screw and move said first platform and said connector placement means along said first and second vertical roundways, whereby said second platform and said engagement means can be moved along said first and second vertical roundways by said support rods.

5. Apparatus in accordance with claim 3 wherein said switch engagement means comprises:

a carriage movably mounted on said second plaform for movement toward and away from said lineup of said switches;

a third drive means for moving said carriage along said second platform;

first and second sets of engagement jaws, each of said sets being adapted for opening and closing about said edge of said switch; and an operating mechanism for opening and closing said engagement jaws about said edge so that said switch can be grasped, whereby said switches can be removed from and replaced in said lineup.

6. Apparatus in accordance with claim 5 wherein said third drive means comprises a ball screw engaging said carriage, and a third motor for rotating said ball screw to drive said carriage along said second platform.

7. Apparatus in accordance with claim 5 wherein said switch comprises a printed circuit board having said edge accessible to said engagement jaws when said switch is mounted in said lineup; said switch includes registration holes along said edge, and wherein each said set of engagement jaws includes:

a first jaw having a registration pin thereon adapted to mate with a respective said registration hole when said jaw is closed about said edge of said switch to accurately register said switch with respect to said set of jaws; and a second jaw adapted for closing about said edge opposite said first jaw and having a stop thereon including an opening therethrough adapted to receive said registration pin so that said edge is accurately positioned and grasped between said first and second jaws.

8. Apparatus in accordance with claim 5 wherein said operating mechanism comprises:

a cam shaft;

a fouth motor for rotating said cam shaft;

a plurality of cams on said cam shaft associated with respective ones of said engagement jaws; and cam followers responsive to the rotation of respective said cams for operating respective said engagement jaws to thereby open and close said engagement jaws about said edge.

9. Apparatus in accordance with claim 8 wherein each said set of engagement jaws comprises first and second jaws and wherein said operating mechanism includes first and second springs biasing said first and second jaws, respectively, toward closed and open positions, respectively, about said edge, said first jaw and said second jaw being forced toward said open and said closed positions, respectively, by respective said cam followers in opposition to said first and second springs whereby said first jaw is force limited and said second jaw is displacement limited in said closed positions about said edge.

10. Apparatus in accordance with claim 8 wherein said test connector comprises:

first and second connector jaws operable by said operating mechanism for opening ad closing with respect to each other about said edge to grasp said edge therebetween; and a plurality of test terminals on each of said connector jaws adapted to mate with said test lands on respective sides of said edge whereby test access can be provided to said switch.

11. Arrangement in accordance with claim 10 wherein respective ones of said plurality of said cams on said cam shaft are operably associated with said first and second connector jaws; and wherein said plurality of cams have profiles which cause said connecors jaws to close about said edge after said engagement jaws close thereabout and to open from said edge before said engagement jaws open, whereby said edge is properly registered with respect to said connector jaws when said connector jaws are closed thereabout.

12. Apparatus in accordance with claim 5 wherein said connector placement means comprises first and second connector placement units mounted on said first platform and adapted to receive said switch therebetween when said switch is removed from said lineup so that said first and second units have access to first and second sides of said switch, respectively, each of said first and second units including:

at least one magazine for storing a plurality of said connectors;

at least one placement head adapted for grasping a connector for removing said connector from said magazine and for placing and removing said connectors on said terminals on said switch; and at least operating means for moving said placement head between said magazine and said switch.

13. Apparatus in accordance with claim 12 wherein said placement head comprises a pair of spring jaws adapted for grasping a tab on one of said connectors to thereby hold said connector; and said operating means includes opening means for opening said spring jaws to release said connector.

14. Apparatus in accordance with claim 12 wherein said operating means includes:

a plunger for moving said placement head toward and away from said switch;

a mounting sleeve about said plunger for rotating said plunger and said placement head to and from a position providing access to said connectors in said magazine;

a cam shaft having a plurality of cams thereon; and a cam drive for rotating said cam shaft and said cams, said plunger and aid mounting sleeve being responsive to the rotation of respective ones of said cams for moving said placement head.

15. Apparatus in accordance with claim 14 wherein said placement head comprises a pair of spring jaws for grasping one of said connectors; and said operating includes means for opening and closing said spring jaws to discard and grasp said connectors, respectively, and a control circuit responsive to respective ones of said cams for coordinating said opening and closing means with said plunger and said mounting sleeve whereby said connectors can be removed from said magazine and placed on and removed from said switch.

16. Apparatus in accordance with claim 12 each of said first and second units includes two each of said magazines, said placement heads, and said operating means whereby each said unit can place and remove two different configurations of said connectors on said switch.

17. Apparatus in accordance with claim 5 wherein said operating mechanism comprises:

linkages operable associated with each of said engagement jaws for opening and closing said jaws; and solenoids for moving said linkages to close and open said jaws.

18. Apparatus in accordance with claim 1 wherein said switch engagement means comprises:

first and second sets of engagement jaws, each of said sets of jaws being adapted for opening and closing about said edge of said switch;

an operating mechanism for opening and closing said engagement jaws to release and grasp said switch, respectively;

carriage means for moving said jaws toward and away from said lineup of said switches so that said switches can be removed from and replaced in said lineup; and mounting means for mounting said carriage means to said positioning means so that said carriage means can be moved about said lineup.

19. Apparatus in accordance with claim 18 wherein said test connector comprises:

first and second connector halves mounted on said carriage and adapted for opening and closing about said edge of said switch;

a plurality of terminals on each of said connector halves adapted to contact said test lands and establish test access thereto when said connector halves are closed about said edge; and said operating mechanism includes means for opening and closing said connector halves about said edge in coordination with said opening and closing of said engagement jaws.

20. Apparatus in accordance with claim 1 wherein said connector placement means comprises first and second connector placement units adapted to receive said switch therebetween when said switch is removed from said lineup so that said first and second units have access to first and second sides of said switch, respectively, each of said first and second units including:

at least one magazine for storing a plurality of said connectors;

at least one placement head adapted for grasping one of said connectors for removing said connector from said magazine and for placing and removing said connectors on said terminals of said switch; and at least one operating means for moving said head between a first position providing access to said connectors in said magazine and a second position for placement and removal of said connectors on said switch.

21. Apparatus in accordance with calim 20 wherein said operating means includes:

a plunger for moving said placement head toward and away from said switch;

a mounting sleeve about said plunger for rotating said plunger and said placement head;

a cam shaft having a plurality of cams thereon; and a cam drive for rotating said cam shaft and said cams, said plunger and said mounting sleeve being responsive to the rotation of respective ones of said cams for moving said placement head between said first and second positions.

22. Apparatus in accordance with claim 21 wherein said placement head comprises a pair of spring jaws for grasping one of said connectors; and said operating means includes means for opening and closing said spring jaws to discard and grasp said connectors, respectively, and a control circuit responsive to the rotation of respective ones of said cams for coordinating said opening and closing with the movement of said placement head between said first and second positions whereby said connectors can be removed from said magazine and placed on and removed from said switch.

23. Apparatus in accordance with claim 19 wherein each said unit includes two each of said magazines, said placement heads and said operating units whereby each said unit can place and remove two different configurations of said connectors on said switch.

24. Automated apparatus responsive to control signals for establishing and terminating cross-connections and providing test access to switches in an automated main distributing frame having a plurality of said switches in a modular lineup with a plurality of rows and columns of said switches served by said apparatus, each of said switches including terminals thereon adapted to receive connectors therebetween for establishing said cross-connections and test lands along an edge thereof, comprising, in combination:

a switch engagement means including first and second engagement jaws adapted for grasping and holding said switches so that said switches can be withdrawn from and replaced in said lineup, first and second connector halves adapted for opening and closing about said edge to establish said test access with said test bands, and operating mechanism for opening and closing siad engagement jaws and said connector halves in a coordinated sequence, and means for moving said engagement jaws and said connector halves toward and away from said switches in said lineup;

connector placement means for placing said connectors between said terminals when said switch is removed from said lineup and held by said engagement means comprising a magazine for storing a plurality of said connectors, a placing head for grasping said connectors to place and remove said connectors between said terminals, and an operating means for moving said placement head between a first position providing access to said connectors in said magazine and a second position allowing said connectors to be placed on and removed from said terminals;

means for positioning said engagement means and said connector placement means adjacent any respective said switch in said plurality of rows and columns comprising a horizontal guide mounted on said lineup, a support member movably mounted on said horizontal guide, a first drive means responsive to said control signals for moving said support member along said horizontal guide to the one of said columns containing said respective switch, a vertical guide mounted on said support member, platform means movably mounting said engagement means and said connector placement means on said vertical guide, and a second drive means responsive to said control signals for moving said platform means along said vertical guide to the desired one of said rows containing said respective switch whereby said switch engagement means and said connector placement means can be positioned adjacent said respective switch.

* * * * *

UNITED STATES PATENT AND TRADEMARK OFFICE

CERTIFICATE OF CORRECTION

PATENT NO. : 3,919,503

DATED : November 11, 1975

INVENTOR(S) : Hans Jack Friedrichsen, Peter Frank Mahr, and Alfred Otto Schwarz

It is certified that error appears in the above-identified patent and that said Letters Patent are hereby corrected as shown below:

Column 3, line 38, change "tis" to --its--; line 40, change "on" to --to--. Column 4, line 19, after "outward" insert --with-- and delete "respedt". Column 6, line 8, change "aND" to --and--; line 58, after "180" insert --182--. Column 7, line 36, change "98a" to --98b--; line 60, change "placemnt" to --placement--. Column 9, line 13, change "reguires" to --requires--; line 49, change "ans" to --and--; line 58, change "rotated" to --rotate--. Column 10, line 2, change "22" to --222--; line 12, change "relay", first occurrence, to --relays--; line 15, after "connected" insert --to--; line 38, change "plungerr" to --plunger--; line 62, change "cnnector" to --connector--. Column 14, claim 10, line 21, change "ad" to --and--; claim 11, line 28, change "Arrangement" to --Apparatus--; claim 11, line 32, change "connecors" to --connector--. Column 15, claim 14, line 2, change "aid" to --said--; claim 16, line 16, after "12" insert --wherein--. Column 16, claim 24, line 54, change "siad" to --said--. Column 17, claim 24, line 2, after the semicolon insert --and--.

Signed and Sealed this

*eleventh* Day of *May 1976*

[SEAL]

*Attest:*

RUTH C. MASON
*Attesting Officer*

C. MARSHALL DANN
*Commissioner of Patents and Trademarks*